United States Patent [19]

Gossain et al.

[11] Patent Number: 4,585,388

[45] Date of Patent: Apr. 29, 1986

[54] SELF-RELOCATING MANIPULATOR

[75] Inventors: Devendra M. Gossain, Downsview; Savinder S. Sachdev, Richmond Hill, both of Canada

[73] Assignee: Spar Aerospace Limited, Mississauga, Canada

[21] Appl. No.: 608,182

[22] Filed: May 8, 1984

[51] Int. Cl.[4] ............................................. B25J 15/04
[52] U.S. Cl. .................................. 414/735; 414/729; 414/4; 414/680; 901/1; 901/50
[58] Field of Search .................. 414/4, 680, 735, 738, 414/750, 729; 901/1, 50; 365/11 A

[56] References Cited

U.S. PATENT DOCUMENTS 4,303,368 12/1981 Dent et al. .......................... 414/4 X
4,370,091 1/1983 Gagliardi ........................... 414/4 X

OTHER PUBLICATIONS

Klein et al., "Computer Coordination . . . for Space Assembly" IEEE Trans., vol. SMC-12, No. 6, 11/1982.

Primary Examiner—Terrance L. Siemens
Attorney, Agent, or Firm—Fetherstonhaugh & Co.

[57] ABSTRACT

A self relocating manipulator assembly which is movable so as to be secured to any one of a number of fixtures which are spaced from one another on a support structure. The manipulator assembly comprises, a boom which has first and second end effectors each adapted to releasably secured to any one of the fixtures. First and second articulators are provided which serve to mount the first and second end effectors at first and second ends of the boom respectively. The first and second articulators provide a sufficient degree of movement between the end effectors and the boom to allow one end effector to be moved toward and away from one of said fixtures while the other end effector remains mounted on one of said fixtures. A power transmission system is associated with each articulator for articulating the boom with respect to either end effector whereby the manipulator assembly may relocate itself by sequentially securing and releasing one of the end effectors and then the other with respect to said fixtures.

14 Claims, 4 Drawing Figures

SELF-RELOCATING MANIPULATOR

This invention relates to self relocating manipulator assemblies. In particular, this invention relates to a self relocating manipulator assembly of a type suitable for use in space.

PRIOR ART

A remote manipulator arm for use in space is presently the form of manipulator used by the NASA Space-shuttle orbiters for the purposes of launching, capturing and retrieving satelites and the servicing of satelites in or near the bay of the shuttle orbiter. The proximal end of the manipulator arm is permanently secured to a shuttle orbiter and the distal end is adapted to be releasably secured to grapple fixtures which are mounted on the various components which are to be manipulated thereby. It follows that the range of operation of the manipulator arm including the spatial volume in which an object secured to the distal end can be manoeuvred, is limited by the maximum extent of the distal end of the manipulator arm with respect to the proximal end as well as the location of the secured end. While the weightlessness of space permits the use of very long manipulator arms, a substantial amount of space is required in the cargo bay of the shuttle orbiter to accommodate the large manipulator arm and this space is space which is not availabe for payload purposes. Very long manipulators also pose problems for precise control and need correspondingly large spatial volumes, to operate while manipulating objects. Furthermore, the weight of the arm is a function of its length and any weight reduction which can be effected is advantageous as it would permit a corresponding increase in weight of payload.

We have found that the difficulties described above with respect to the known manipulator arm in its applications to other space vehicles or spacecraft can be overcome by providing a self relocating manipulator assembly and a plurality of fixtures on which the self relocating assembly may locate itself.

By providing a self relocating manipulator assembly, the range of the manipulator and its spatial working volume is no longer limited by the length of the manipulator arm and its permanent fixity at one end. By reason of the fact that the range is not limited by the length of the manipulator arm, it is possible to reduce the size of the manipulator assembly, thereby reducing the storage space occupied by the manipulator arm and reducing the weight of the manipulator arm to effect corresponding increases in storage and payload capacity of the vehicle in association with which the manipulator assembly is to be used.

SUMMARY OF INVENTION

According to one aspect of the present invention, a self relocating manipulator assembly which is movable so as to be secured to any one of a number of fixtures which are spaced from one another on a support structure, said manipulator assembly comprising a boom having first and second ends which are spaced from one another, first and second end effectors each adapted to releasably secured to any one of said fixtures, first and second articulator means mounting said first and second end effectors and said first and second ends of said boom respectively, said first and second articulating means providing a sufficient degree of movement between the end effectors and the boom to allow one end effector to be moved toward and away from one of said fixtures while the other end effector remains mounted on one of said fixtures, and power transmission means associated with each articulator means for articulating the boom with respect to either end effector whereby the manipulator assembly may relocate itself by sequentially securing and releasing one of said end effectors and then the other of said end effectors with respect to said fixtures.

According to a further aspect of the present invention a self relocating manipulator assembly comprising a boom which comprises first and second elongated arms each having a proximal end and a distal end, a powered elbow joint connecting the proximal ends of said arms, said powered elbow joint being operable to move the distal ends of said arms toward and away from one another, first and second articulator means mounted one at each distal end of said arms, said articulator means comprising a powered pitch joint, a powered yaw joint and a powered roll joint, serially connected to one another and being operable to provide movement about pitch, yaw and roll axes, first and second end effectors connected to said first and second articulator means respectively so as to have three degrees of movement with respect to each arm of said boom and, power transmission means for transmitting power to each powered joint as required in use to effect manipulation of said manipulator.

The invention will be more clearly understood after reference to the following detailed specification read in conjunction with the drawings wherein.

Figure 1:
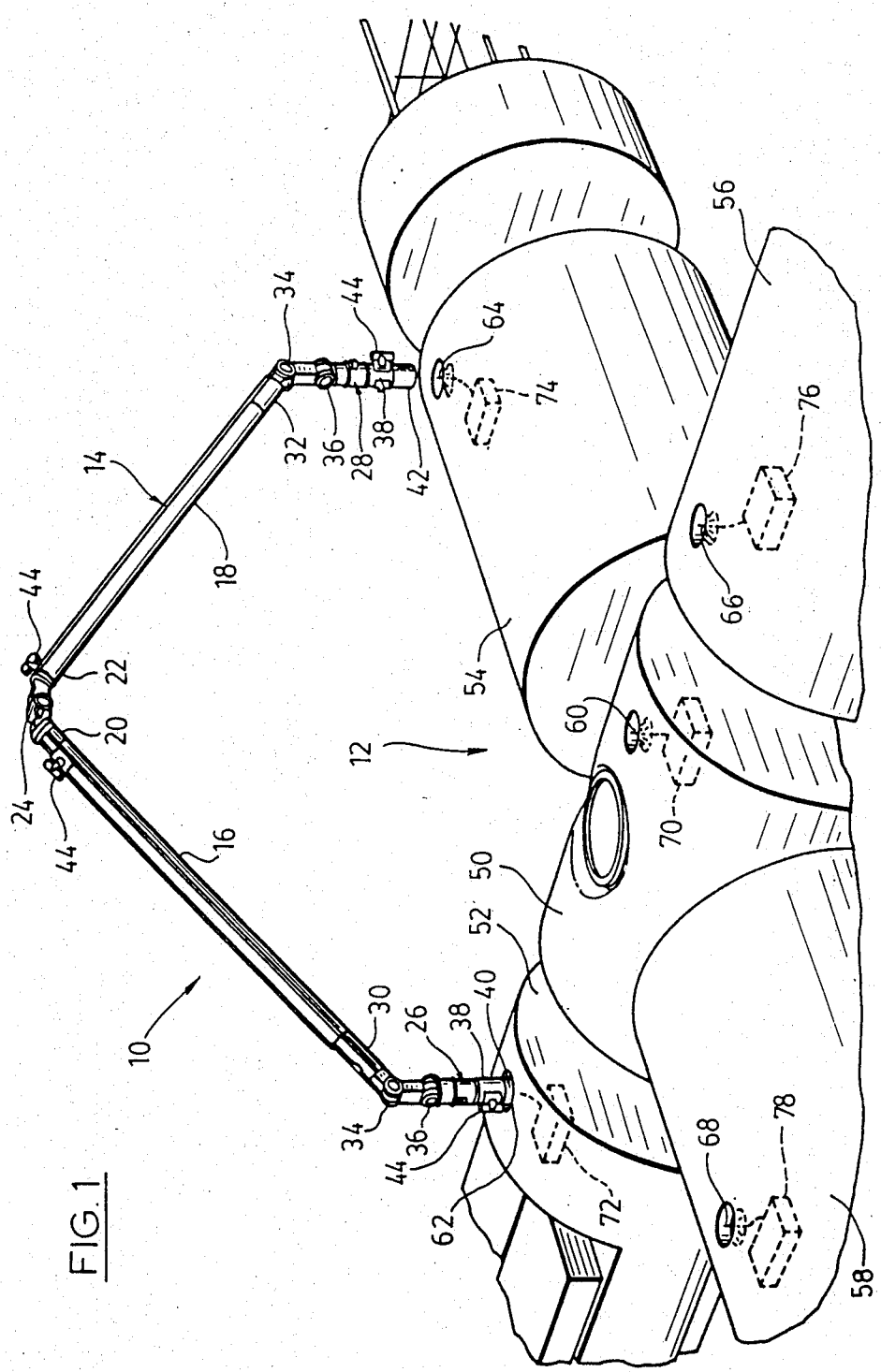
FIG. 1 is a pictorial view of a self relocating manipulator constructed in accordance with an embodiment of the present invention showing its use in association with a space station.

With reference to FIG. 1 of the drawings, it will be seen that the reference numeral 10 refers generally to a self relocating manipulator assembly and the reference numeral 12 refers generally to a space station.

The self relocating manipulator comprises a boom which is generally identified by the reference numeral 14 which consists of first and second longitudinally elongated arms 16 and 18. The proximal ends 20 and 22 of the arms 16 and 18 are connected by means of a powered elbow joint 24. A first articulator 26 and a second articulator 28 are mounted at the distal ends 30 and 32 of the arms 16 and 18 respectively. Each articulator consists of a powered pitch joint 34, a powered yaw joint 36 and a powered roll joint 38. First and second end effectors 40 and 42 are mounted at the free ends of the articulators 26 and 28 respectively.

Cameras 44 are mounted at various points on the arms and articulated for the purposes of monitoring the movement of the manipulator arms and the movement of the end effectors to facilitate accurate location of the end effectors as required in use.

The space station 12 typically comprises a plurality of modules 50, 52, 54, 56 and 58, each of which has a grapple fixture 60, 62, 64, 66 and 68 located thereon.

The grapple fixtures 60, 62, 64, 66 and 68 and the end effectors 40 and 42 may be of any suitable construction such as that described in U.S. Pat. No. 4,105,241 dated Aug. 18, 1978 and assigned to Spar Aerospace Limited.

A power source 70, 72, 74, 76 and 78 is associated with each grapple fixture 60, 62, 64, 66 and 68 respectively. The power sources 70, 72, 74, 76 and 78 may be in the form of electrical outlets supplied by an electrical power source on the station, storage cells or the like. The fixtures 60, 62, 64, 66 and 68 are adapted to permit electrical power to be transmitted to power lines of the manipulator when an end effector is connected thereto.

Figure 2:
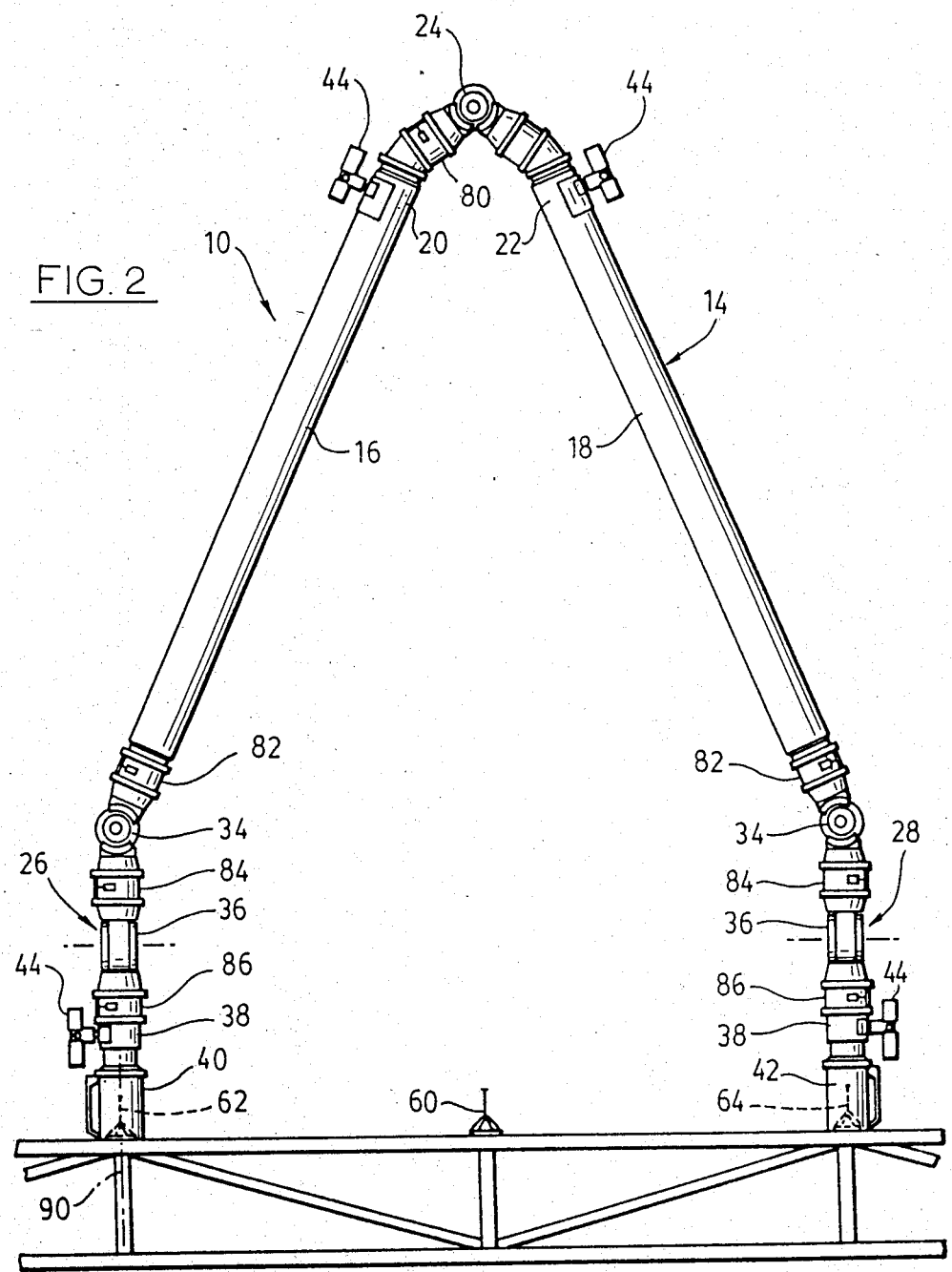
FIG. 2 is a side view of the manipulator of FIG. 1 showing both ends attached to a support structure.

As shown more clearly in FIG. 2 of the drawings, the elbow joint 24 has an elbow drive motor 80 and the pitch joint 34 has a pitch drive motor 82, the yaw joint 36 has a yaw drive motor 84 and the roll joint 38 has a roll drive motor 86.

In the embodiment illustrated in FIGS. 1 and 2 of the drawings, the motors 80, 82, 84 and 86 are automatically connected to a power source when one or other of the end effectors 40, 42 are connected to a grapple fixture.

In use, when the self relocating manipulator of FIGS. 1 and 2 is mounted with both end effectors 40 and 42 and secured to a fixture as illustrated in FIG. 2 of the drawings, relocation is effected by activating the end effector 42 to cause it to release the latching probe. The pitch joint motors are then activated to cause the boom 14 to pivot to raise the end effector 42 away from its associated latch probe. The roll motor 86 is then activated to cause the boom 14 to rotate about the axis 90 of the roll joint 38 to move the end effector 42 to a point adjacent a further fixture such as the fixture 66. If the fixture 66 is further away from the fixture 62 then was the fixture 64, the elbow drive motor 80 and pitch drive motors 82 are activated to manipulate the end effector 42 to a position in which it is aligned with the grapple fixture with respect to which it is to be secured. The various cameras 44 facilitate the adjustment of the boom to obtain this alignment.

After the end effector 42 has been secured to a new fixture such as the fixture 66, the end effector 40 may be released and the various manipulating steps previously described may be repeated so that the end effector 40 may be relocated and secured with respect to a further fixture such as the fixture 68. In this manner, it will be seen that by repeated successive securing and releasing of either of the end effectors and appropriate manipulation of the boom, it is possible to cause the manipulator assembly to relocate itself by securing the free end thereof to any one of a number of fixtures which are located within the range of the extension of the boom.

Figure 3:
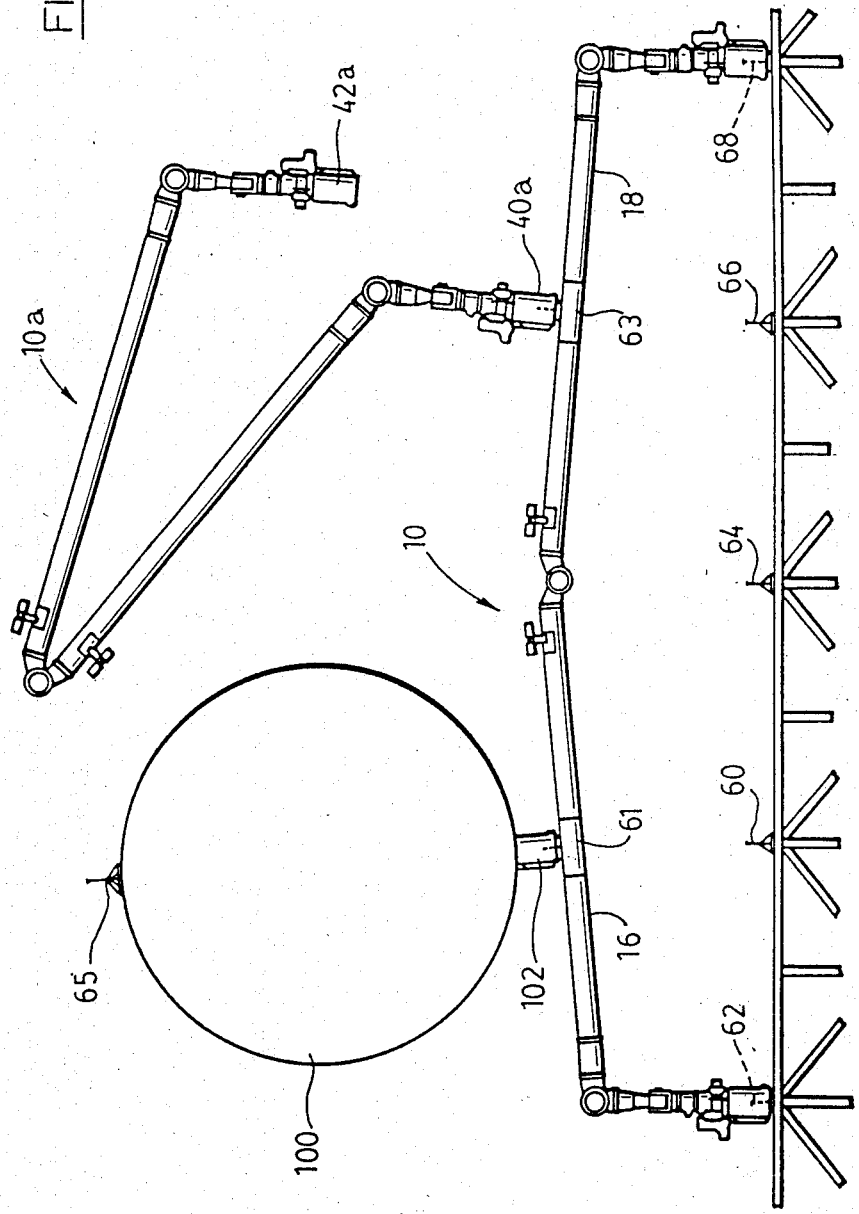
FIG. 3 is a side view similar to FIG. 2 showing a payload and a second manipulator mounted on the first manipulator.
Figure 4:
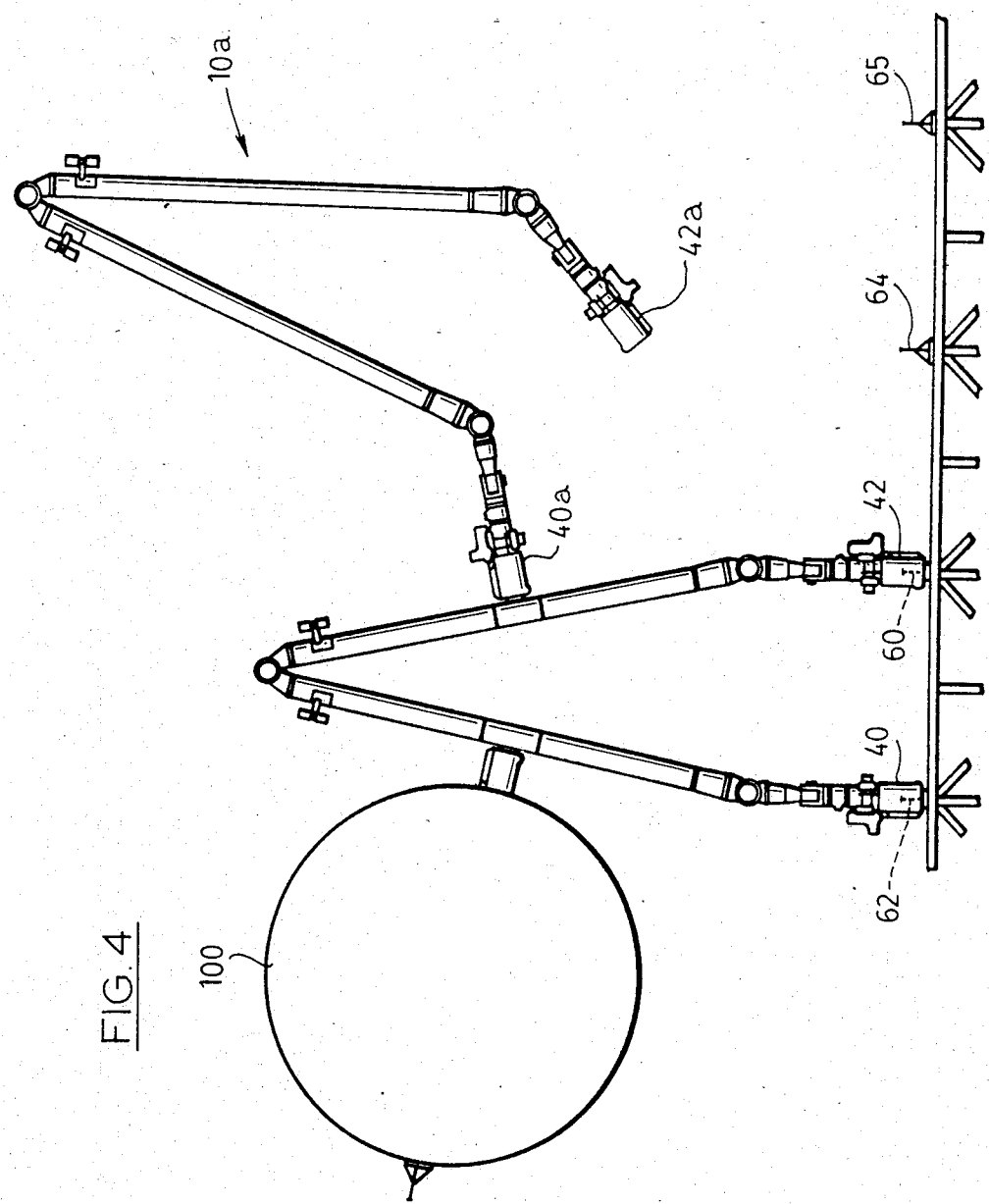
FIG. 4 is a side view similar to FIG. 3 showing the first manipulator in a second position.

This self relocating manipulator can be used for the purposes of providing a transporter for transporting a payload and one such embodiment is illustrated in FIGS. 3 and 4 of the drawings. In this embodiment, the manipulator 10 differs from that illustrated in FIGS. 1 and 2 of the drawings only in that fixtures 61 and 63 are mounted on the arms 16 and 18 respectively. A second manipulator assembly 10a which is identical to the first manipulator assembly 10 is mounted on the fixtures 63 and a load item 100 which is formed with an end effector 102 and a fixture 65 is mounted on the fixture 61. The load item 100 may be a payload item which may be transported along a space station by moving the manipulator 10 as previously described and which may be mounted on and released from the manipulator 10 by activating the manipulator 10a so that its end effector 42a engages the fixtures 65a and the end effector 102 is released to permit the manipulator 10a to move the load unit 100 to any required location.

The load unit 100 may, however, be in the form of an electrical storage device or an electrical generating device such as a solar panel which may serve to act as a power source for the manipulator 10 and manipulator 10a such that the manipulator assembly is a self propelled unit which may operate independently of a power source carried by the space station.

It would also be apparent that either one of the end effectors 40, 42, 40a and 42a may be used to support and operate a power tool for use in servicing and assembling various components of the space station.

It will be apparent from FIGS. 3 and 4 of the drawings that the self relocating manipulator assembly may be used for the purposes of relocating the load unit 100 and the secondary manipulator assembly 10a by sequentially releasing and securing the various end effectors 40, 42, 40a and 42a.

The fixtures 60, 62, 64, 66 and 68 which are illustrated in FIGS. 3 and 4 of the drawings may be located at spaced intervals along the cargo bay of the shuttle orbiter such that the manipulator assembly may be operated to walk along the cargo bay to a point close to the point where the work is to be undertaken at which point one end effector may remain secured while the work is carried out by the other end effector.

It is anticipated that the self relocating manipulator assembly of the present invention will be particularly applicable in the assembly and servicing of space stations wherein it is necessary to carry out work at points spaced a substantial distance from one another.

Various modifications of the present invention will be apparent to those skilled in the art. If, for example, all of the anchor devices are secured at uniformly spaced intervals, the boom 10 may be a one piece assembly eliminating the need for the elbow joint 24. Furthermore, there may be applications in which the yaw joint is not required.

From the foregoing it will be apparent that the present invention provides a simple and inexpensive form of self relocating manipulator.

I claim:

1. A self relocating manipulator arm which is movable so as to be secured to any one of a number of powered fixtures which are spaced from one another on a support structure, said manipulator arm comprising:
    (a) a boom having first and second ends which are spaced from one another,
    (b) first and second end effectors each adapted to releasably secured to any one of said powered fixtures,
    (c) first and second articulator means mounting said first and second end effectors at said first and second ends of said boom respectively, said first and second articulating means providing a sufficient degree of movement between the end effectors and the boom to allow one end effector to be moved toward and away from one of said fixtures while the other end effector remains mounted on one of said powered fixtures, and
    (d) power transmission means communicating with each articulator means and siad first and second end effectors for transmitting power through one of said first or second end effectors, when it is secured to one of said powered fixtures, to said first and second articulator means and to the other of said first and second end effectors for articulating the boom with respect to either end effector whereby the manipulator assembly may relocate itself by sequentially securing and releasing one of said end effectors and then the other of said end effectors with respect to said powered fixtures.

2. A self relocating manipulator arm as claimed in claim 1, wherein said boom comprises first and second arms each having a distal end and a proximal end, an elbow joint connecting the proximal ends of said arms, the distal ends of said arms forming the first and second ends of said boom, said power transmission means being adapted to power said elbow joint to effect rotation or movement about said elbow joint to cause said end effectors to move toward and away from one another as required in use.

3. A self relocating manipulator arm as claimed in claim 2, wherein said first and second articulator means each comprise a pitch joint about which the boom may pitch with respect to either end effector to permit movement of each end effector toward and away from its associated fixture as aforesaid.

4. A self relocating manipulator arm as claimed in claim 3, wherein said articulator means further comprises a roll joint about which the boom may rotate with respect to one fixture when the other end effector is free of attachment from another fixture so as to permit relocation of said other end effector.

5. A self relocating manipulator arm as claimed in claim 4 wherein said articulator means each comprise a yaw joint about which the boom may be relocated with respect to each articulator about an axis which extends at right angle to the axis of the pitch joint to permit angular adjustment of the boom with respect to the end effectors.

6. A self relocating manipulator arm as claimed in claim 5 wherein said power transmission means comprises electric motor means associated with said elbow joint, said pitch joints, said roll joints and said jaw joints.

7. A self relocating manipulator arm as claimed in claim 6 for use in association with a support structure which supports end fixtures further comprising a power source carried by said support structure, said power transmission means being connected to said power source when one or other of said end effectors is connected to a fixture mounted on said support structure.

8. A self relocating manipulator arm as claimed in claim 6 further comprising a power source mounted on said boom for movement with said boom thereby to provide a self propelled, self relocating manipulator.

9. A self relocating manipulator arm as claimed in claim 1 wherein berthing fixtures are mounted on said boom for supporting a load on said boom for transportation therewith during relocation of said boom.

10. A self relocating manipulator arm as claimed in claim 9 wherein said berthing fixtures are adapted to be releaseably engaged by an end effector of the same type as that secured to said first and second ends of said boom whereby a second self relocating manipulator assembly may be releaseably secured thereto for transportation therewith.

11. A self relocating manipulator arm assembly comprising:
(a) first and second elongated arms each having a proximal end and a distal end,
(b) a powered elbow joint connecting the proximal ends of said arms, said powered elbow joint being operable to move the distal ends of said arms toward and away from one another,
(c) first and second articulator means mounted one at each distal end of said arms, said articulator means comprising a powered pitch joint, a powered yaw joint and a powered roll joint, serially connected to one another and being operable to provide movement about pitch, yaw and roll axes,
(d) first and second end effectors connected to said first and second articulator means respectively so as to have three degrees of movement with respect to each arm of said boom and,
(e) power transmission means communicating with each articulator means and said first and second end effectors for transmitting power through one of said first or second end effectors, when it is secured to one of said powered fixtures, to said first and second articulator means and to the other of said first and second end effectors for articulating the boom with respect to either end effector whereby the manipulator assembly may relocate itself by sequentially securing and releasing one of said end effectors and then the other of said end effectors with respect to said powered fixtures.

12. A self relocating manipulator assembly which is movable so as to be secured to any one of a number of fixtures which are spaced from one another on a support structure, said manipulator assembly comprising:
(a) a boom having first and second ends which are spaced from one another,
(b) first and second end effectors each adapted to releasably secured to any one of said fixtures,
(c) first and second articulator means mounting said first and second end effectors and said first and second ends of said boom respectively, said first and second articulating means providing a sufficient degree of movement between the end effectors and the boom to allow one end effector to be moved toward and away from one of said fixtures while the other end effector remains mounted on one of said fixtures, and
(d) power transmission means associated with each articulator means for articulating the boom with respect to either end effector whereby the manipulator assembly may relocate itself by sequentially securing and releasing one of said end effectors and then the other of said end effectors with respect to said fixtures,
(e) berthing fixtures mounted on said boom for supporting a load on said boom for transportation therewith during relocation of said boom, said berthing fixtures being adapted to be releaseably engaged by an end effector of the same type as that secured to said first and second ends of said boom whereby a second self relocating manipulator assembly may be releaseably secured thereto for transportation therewith.

13. A manipulator arm for use in association with a number of powered fixtures which are spaced from one another on a support structure comprising:
(a) first and second elongated arms each having a proximal end and a distal end,
(b) a powered elbow joint connecting the proximal ends of said arms, said powered elbow joint being operable to move the distal ends of said arms toward and away from one another,
(c) first and second end effectors each adapted to releasably secured to any one of said fixtures, (d) first and second articulator means located one at each distal end of said arms and mounting said first and second end effectors at the distal end of said first and second arms respectively, said first and second articulating means providing a sufficient degree of movement between the end effectors and the arms to allow one end effector to be moved toward the away from one of said fixtures while the other end effector remains mounted on one of said fixtures, and (e) power transmission means communicating with with each articulator means through one of said first or second end effectors for transmitting power to said first and second articulator means and to the other of said first and second end effectors for articulating the arm assembly with respect to either end effector and to drive said other end effector as required in use.

14. In a space orbitor the improvement of;

(a) a plurality of powered fixtures located at spaced intervals on an orbitor;

(b) first and second elongated arms each having a proximal end and a distal end, (c) a powered elbow joint connecting the proximal ends of said arms, said powered elbow joint being operable to move the distal ends of said arms toward and away from one another, (d) first and second articulator means mounted one at each distal end of said arms, said articulator means comprising a powered pitch joint, a powered yaw joint and a powered roll joint, serially connected to one another and being operable to provide movement about pitch, yaw and roll axes, (e) first and second end effectors connected to said first and second articulator means respectively so as to have three degrees of movement with respect to each arm of said boom and, (f) power transmission means communicating with each articulator means and said first and second end effectors for transmitting power through one of said first or second end effectors, when it is secured to one of said powered fixtures, to said first and second articulator means and to the other of said first and second end effectors for articulating the boom with respect to either end effector whereby the manipulator assembly may relocate itself by sequentially securing and releasing one of said end effectors and then the other of said end effectors with respect to said powered fixtures.

* * * * *